Dec. 15, 1942.   E. B. COLLINS   2,304,797
STAR FINDER
Filed Nov. 13, 1941

INVENTOR
E. B. Collins
BY
ATTORNEY

Patented Dec. 15, 1942

2,304,797

UNITED STATES PATENT OFFICE 2,304,797

STAR FINDER

Elmer B. Collins, Washington, D. C.

Application November 13, 1941, Serial No. 418,887

8 Claims. (Cl. 35—44)

(Granted under the act of March 3, 1883, as amended April 30, 1928; 370 O. G. 757)

This invention relates to a star finder, especially useful for aviators but likewise useful for mariners in quickly and easily finding or identifying any one of the particular visible stars usually used in navigators' problems.

A further object of this invention is to aid in the identification of any observed unknown star or planet when the celestial body's altitude has been measured with a sextant or bubble octant, as customary, and its bearing simultaneously noted from the plane's or ship's compass.

A further object of this invention is to provide a star finder which permits the selection of favorable bearing of stars at dawn or twilight near the ship's or plane's dead reckoning position for the later purpose of permitting the determination of the true position of the craft on the earth's surface.

A further object of this invention is to provide a star finder which is small, handy, convenient and compact and which may be quickly manipulated and held in one hand during operation, leaving the operator's other hand free for other operations.

A further object of this invention is to provide a star finder especially meeting the need of the aviator because of the simplicity of its initial setting and ease of manipulation of an attached swinging template with all readings made by mere eye inspection.

Figure 1:
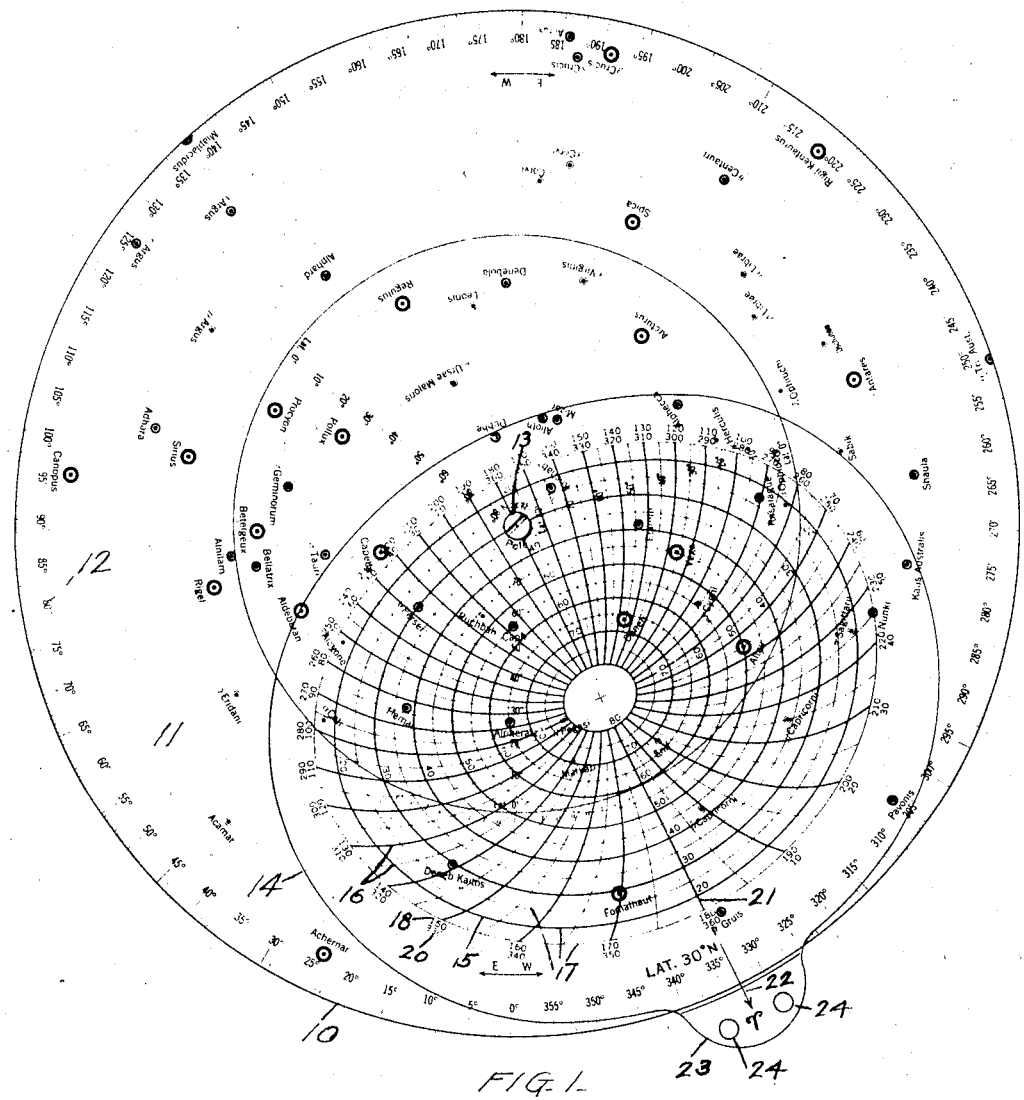
Figure 2:
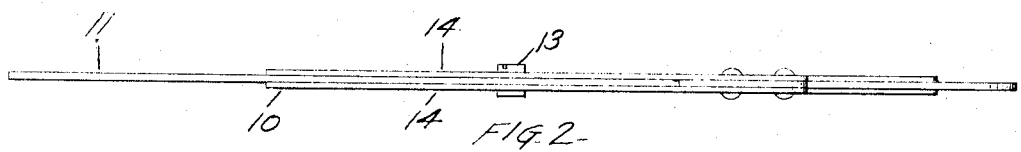

With the foregoing and other objects in view, the invention consists in the construction, combination and arrangement of parts hereinafter described and illustrated in the drawing, in which, Fig. 1 is an elevational plan view of the star finder of this invention; and Fig. 2 is an edge view of Fig. 1.

The star finder 10 of this invention includes a circular stationary star base 11 which, in actual construction, may be approximately 8 inches in diameter. Shown on this star base 11 is a polar azimuthal equidistant projection of the stars. On the obverse side, shown in the drawing, this star base 11 illustrates all the bright navigational stars of the northern hemisphere with the North Pole shown at the center of the base, while on the reverse side is shown the bright navigational stars of the southern hemisphere with the South Pole located at the center of the star base. On the outer periphery of both sides of the circular star base 11 is shown a divided time scale 12 indicating the hour angle of Aries τ in half degrees of arc, although it will be understood that this can be indicated in hours or minutes of sidereal time.

The time is marked to increase in value clockwise to the eastward, although it could equally be marked to increase in value counterclockwise to the westward. Eccentrically attached by means of an axle and nub 13 through the polar centers of the obverse and reverse sides of the base 11 are a pair of identical or substantially identical templates 14. Templates 14, as shown, have been plotted for latitude of 30 degrees and can be used without any appreciable error for at least 5 and possibly 10 degrees either side thereof. It is contemplated, however, to provide a separate template for each 10 degrees of latitude, whereby the maximum error for any location would at most be 5 degrees from the nearest template. Such error, however, can easily be interpolated in use and does not affect the final result whatsoever. These templates are made of transparent material on which calculated curves are imprinted in such a manner that the star positions on the base 11 are visible therethrough.

The complete star finder made up for each 10 degrees of latitude, therefore, consists of seven identical star bases and seven pairs of substantially identical templates, each pair of templates, as mentioned above, being calculated for the different latitude bands from the equator to 70 degrees latitude north or south. The marked curves 17 of equal altitude on each template 14 show the altitudes from 10 degrees above the horizon to the zenith of 90 degrees. The marked curves 16 of equal azimuth on each template show azimuths from 0 degrees to 360 degrees. The inner degrees of azimuth 18 starting at the top in degrees of arc are used in the northern hemisphere and the outer degrees 20 commencing at the bottom are used in the southern hemisphere.

The 180°–360° line 21 marks the position of the observer's local meridian and is shown on the template 14 by an index marker 22 which, when set on scale 12 of the star base 11 for any given selected time of observation, automatically orients the template in its true and proper position with respect to the visible stars in the sky. It will be noted that this arrow marker 22 extends onto a projecting tab 23 extending beyond the periphery of the star base 11. These tabs 23 and northern and southern hemisphere templates 14 may be secured together as by rivets 24 extending therethrough beyond the edge of the star base, thus providing a convenient handle for rotating the template about the nub and axle 13 in bringing the marker to the selected time of observation. It will be noted that the nub and axle 13 pass through the position in the template where the template's altitude, equal to the latitude coincides with the observer's local meridian line 21, that is, through a coordinate point on the template located at the intersection of the 180°–360° line with the curve of altitude equal to the latitude of the attached template, the axle also passing through the north and south poles of said base.

The star base 11 and the templates 14 are permanently attached together by means of the nubs at the ends of the axle 13. By setting the arrow or marker index 22 for any specified watch time on the periphery scale 12 of the star base 11 the lines of altitude 17 and of azimuth 16 printed on the template are oriented into a true position with respect to the starry heavens above. The miniature view on the star finder corresponds to the actual visible view of the heavens as seen by the observer so that on the equal curves 15, shown on the template, the altitude 17 and azimuth 16 of any star may be conveniently and easily read by mere eye inspection.

In operation the star finder is used for indicating the visible stars available for observation, especially for advanced observation at twilight for a fix of a vessel's position. The navigator or aviator selects the particular template suitable for the band of latitude in which he is located, which band he will know from dead reckoning. He then pivots the selected template over the star finder, bringing marker line 22 into coordination with the peripheral time scale of the star base, which time scale he uses in accordance with customary practice in coordination with the almanac chart and chronometer. Having thus oriented the template over the star base he can by mere eye inspection of the template determine at what altitude and at what bearing he will find any particular bright navigational star in the heavens.

Thus, looking at the particular star finder shown in Figure 1, Vega is found to be located at an altitude of 45 degrees and a bearing of 295 degrees. By directing his sextant or octant approximately to this particular altitude and bearing he will immediately locate and be able to make an accurate observation with his instrument on this particular star. This procedure is possible even though at twilight or dawn the stars are not easily visible to the naked eye when it is therefore particularly difficult to identify a particular star from its location in the constellation to which it may belong.

Having found any particular star visible in the heavens at dawn or twilight, such star can be identified by a reverse of the above proceeding, that is, after observing the star through his instrument and determining its altitude and taking its bearings from the compass, he can then use these coordinates on the star finder and thus identify the star that is barely visible through his instrument.

Other modifications and changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A star finder for use at or close to a particular latitude comprising a circular star base having a polar azimuthal equidistant projection including a plurality of bright navigational stars shown thereon and a divided time scale adjacent the periphery thereof, a transparent template, means eccentrically pivoting said template to said star base, said template having marked thereon curves of equal altitude and lines of equal azimuth for the particular latitude at which it is to be used, said means for eccentrically pivoting the template to the star base extending through the pole of the star base and through the coordinate point on the template located at the intersection of the 180°–360° line with the curve of altitude equal to the latitude thereof.

2. A star finder for use at or close to a particular latitude comprising a circular star base having a polar azimuthal equidistant projection including a plurality of bright navigational stars shown thereon and a divided time scale adjacent the periphery thereof, a transparent template, means eccentrically pivoting said template to said star base, said template having marked thereon curves of equal altitude and lines of equal azimuth for the particular latitude at which it is to be used, said means for eccentrically pivoting the template to the star base extending through the pole of the star base and through the coordinate point on the template located at the intersection of the 180°–360° line with the curve of altitude equal to the latitude thereof, a tab on said template projecting beyond the periphery of the circular star base, said template tab having imprinted thereon a continuation of the 180°–360° line providing a marker line coordinating with the peripheral time scale of the star base.

3. A star finder for use at or close to a particular latitude comprising a circular star base having the Pole and a plurality of bright navigational stars shown thereon and a divided time scale adjacent the periphery thereof, a transparent template, means eccentrically pivoting said template to said star base, said template having marked thereon curves of equal altitude and lines of equal azimuth for the particular latitude at which it is to be used, said means for eccentrically pivoting the template to the star base extending through the pole of the star base and through the coordinate point on the template located at the intersection of the 180°–360° line with the curve of altitude equal to the latitude thereof, and a tab on said template projecting beyond the periphery of the circular star base, said tab having imprinted thereon a continuation of the 180°–360° line providing a marker line coordinating with the peripheral time scale of the star base, said template tab providing a handle for orienting the template over the star base.

4. A star finder for use at or close to a particular north or south latitude comprising a circular star base having a polar azimuthal equidistant projection including a plurality of bright navigational stars shown on opposite sides thereof, one side of each hemisphere, and a divided time scale adjacent the periphery thereof, a pair of transparent templates, means eccentrically pivoting said templates to said star base on opposite sides thereof, said templates having marked thereon curves of equal altitude and lines of equal azimuth for the particular latitude at which the star finder is to be used, said means for eccentrically pivoting the templates to the star base extending through the poles of the star base and through the coordinate points on the templates located at the intersection of the 180°-306° line with the curve of altitude equal to the latitude thereof, a tab on said templates projecting beyond the periphery of the circular star base, said tabs having imprinted thereon a continuation of the 180°-360° lines providing marker lines coordinating with the peripheral time scales of the star base, and means for fastening the template tabs together beyond the periphery of the star base to provide a handle for orienting the attached templates over the star base.

5. A star finder comprising a plurality of substantially identical circular star bases each star base having a north polar azimuthal equidistant projection on one side thereof and a south polar azimuthal equidistant projection on the other side thereof with the poles located at the centers, and a divided time scale adjacent the periphery of each side thereof, a plurality of pairs of transparent templates, means for pivoting each pair of templates through the poles of the opposite sides of a star base, each pair of templates having marked thereon curves of equal altitude and lines of equal azimuth for a particular latitude at or near which that particular star base and pivoted templates are to be used, said means for eccentrically pivoting each pair of templates to its star base extending through the poles of the star base and through the coordinate points on the templates located at the intersection of the 180°-360° line with the curve of altitude equal to the latitude thereof, tabs on said templates projecting beyond the periphery of the circular star base, said tabs having imprinted thereon a continuation of the 180°-360° lines providing marker lines coordinating with the peripheral time scales of the star base, said tabs being secured together providing a handle for orienting the templates over the star base.

6. A star finder for use at or close to a particular latitude comprising a star base having a circular polar azimuthal equidistant projection thereon and a divided time scale adjacent the periphery thereof, a transparent template eccentrically pivotal over said star base, said template having marked thereon curves of equal altitude and lines of equal azimuth for the particular latitude at which it is to be used, said template being eccentrically pivotal over the star base at the pole of the star base and at the coordinate point on the template located at the intersection of the 180°-360° line with the curve of altitude equal to the latitude thereof, the 180°-360° line having a continuation providing a marker line coordinating with the peripheral time scale of the star base.

7. A star finder for use at or close to a particular latitude comprising a star base having a circular north polar azimuthal equidistant projection on one side thereof and a south polar azimuthal equidistant projection on the other side thereof, and a divided time scale adjacent the periphery of each projection, a transparent template eccentrically pivotal over either star base projection, said template having marked thereon curves of equal altitude and lines of equal azimuth for the particular latitude at which it is to be used, and two series of degree markings at said lines of equal azimuth, said series being displaced 180 degrees apart, one of said two series being for use on the north projection side of the star base and the other series being for use on the south projection side of the star base, said transparent template being eccentrically pivotal over the star base at the pole of the star base and through the coordinate point of the template located at the intersection of the 180°-360° line with the curve of altitude equal to the latitude thereof, the 180°-360° line having a continuation providing a marker line coordinating with the peripheral time scale of the particular projection for which the template is being used.

8. A star finder for use at or close to a particular latitude comprising a star base having a circular north polar azimuthal equidistant projection and a circular south polar azimuthal equidistant projection and a divided time scale adjacent the periphery of each circular projection shown thereon, a series of transparent templates, each template being for a particular band of latitude, each template having marked thereon curves of equal altitude and lines of equal azimuth for a particular latitude within the band in which it is to be used, two series of degree markings at said lines of azimuth, said series being displaced 180 degrees apart, one series being for use with the template on the north polar projection and the other series with the template on the south polar projection, each template being eccentrically pivotal to the star base at the pole of the star base and through the coordinate point on the template located at the intersection of the 180°-360° line with the curve of altitude equal to the latitude thereof, the 180°-360° line having a continuation providing a marker line coordinating with the peripheral time scale of the star base.

ELMER B. COLLINS.